United States Patent
West et al.

(10) Patent No.: US 12,052,063 B2
(45) Date of Patent: Jul. 30, 2024

(54) LOW SLL AESA TAPER CALIBRATION

(71) Applicant: Rockwell Collins, Inc., Cedar Rapids, IA (US)

(72) Inventors: James B. West, Cedar Rapids, IA (US); Connor C. McBryde, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 256 days.

(21) Appl. No.: 17/746,175

(22) Filed: May 17, 2022

(65) Prior Publication Data

US 2023/0412285 A1   Dec. 21, 2023

(51) Int. Cl.
H04B 1/60   (2006.01)
H04B 7/02   (2018.01)
H04B 17/11  (2015.01)

(52) U.S. Cl.
CPC ............... *H04B 17/11* (2015.01); *H04B 7/02* (2013.01)

(58) Field of Classification Search
CPC ........ H04B 17/11; H04B 17/21; H04B 17/22; H04B 17/221
See application file for complete search history.

(56) References Cited

U.S. PATENT DOCUMENTS

| | | | |
|---|---|---|---|
| 8,988,280 B2 | 3/2015 | Mosca et al. | |
| 9,397,766 B2 | 7/2016 | Puzella et al. | |
| 9,979,084 B2 * | 5/2018 | Sikina | H01Q 1/288 |
| 10,256,922 B2 | 4/2019 | Rowell et al. | |
| 10,571,503 B2 | 2/2020 | Paulsen et al. | |
| 10,959,110 B2 * | 3/2021 | Linehan | H01Q 1/246 |
| 2003/0038746 A1 * | 2/2003 | Patel | H01Q 3/267 342/368 |
| 2007/0109179 A1 | 5/2007 | Werntz et al. | |
| 2021/0376938 A1 | 12/2021 | West et al. | |

OTHER PUBLICATIONS

Extended European Search Report dated Oct. 5, 2023; European Application No. 23174104.2.
M. Pardini and K. Papathanassiou, "A Two-Step Phase Calibration Method for Tomographic Applications with Airborne SAR Data," EUSAR 2014; 10th European Conference on Synthetic Aperture Radar, 2014, pp. 1-4.
Xiong, et al. (2015), Beamforming properties and design of the phased arrays in terms of irregular subarrays. IET Microw. Antennas Propag., 9: 369-379. https://doi.org/10.1049/iet-map.2014.0308.

* cited by examiner

*Primary Examiner* — Tuan Pham
(74) *Attorney, Agent, or Firm* — Suiter Swantz IP

(57) ABSTRACT

A system for calibrating ESAs calculates a taper based on ESA element coordinates, and stores the taper as a vector matrix of gain values. The gain values are normalized by accounting for known losses by measuring a central element at minimum attenuation. The normalized gain is then a reference for every other element in the array. The other elements are then measured at various attenuations to identify an attenuation to produce the desired gain. The measurements are performed according to a bisection algorithm. Attenuation may be embodied in a set of digital register values.

13 Claims, 4 Drawing Sheets

LOW SLL AESA TAPER CALIBRATION

BACKGROUND

Low sidelobe active electronically scanned array (ESA) precision is extremely sensitive to phase and amplitude errors in the ESA's passive radio-frequency (RF) combiner circuits, the active radio-frequency integrated circuit (RFIC) beamformer, transmit/receive module RFICs, and the passive radiation aperture. The majority of the military and commercial ESAs require low sidelobe operation. Low sidelobe operation across an ESA's scan volume requires very precise calibration due to electrical phase and amplitude errors in the RF channels and aperture tolerances. These amplitude and phase errors are typically nonuniform with beam scan. Amplitude and phase errors typically worsen with the lower gain settings that are required for low sidelobe operation. Less than 25 dBp ESA sidelobe levels typically require greater than 10 dB amplitude variation from aperture center-to-corner. Typical RFIC performance in a datasheet does not match real performance of the RFIC at lower gain levels, causing higher gain variance across the aperture as lower gain settings are applied under taper. There is, therefore, a need to tune the ESA within tenths of dBs in amplitude and a few degrees of phase precision, specific to low sidelobe operation.

Low sidelobe ESA calibration is traditionally a difficult process, requiring specialized near-field or far-field ranges to sample the fields radiated from (or received by) the ESA under test. These ranges can become prohibitively expensive, require extensive design and analysis, as well as sophisticated mechanical alignment systems to ensure test and measurement accuracy.

SUMMARY

In one aspect, embodiments of the inventive concepts disclosed herein are directed to a system for calibrating ESAs. An amplitude taper is calculated based on ESA element coordinates, and stored as a vector matrix of normalized desired gain values. The gain value measurements are normalized by measuring one or more elements at minimum attenuation. This measurement is then used as a reference for every other measurement. All elements are then measured at various attenuations to determine which attenuation settings produce the desired normalized gain.

In a further aspect, the measurements are performed according to a bisection algorithm. Attenuation may be embodied in a set of digital register values.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
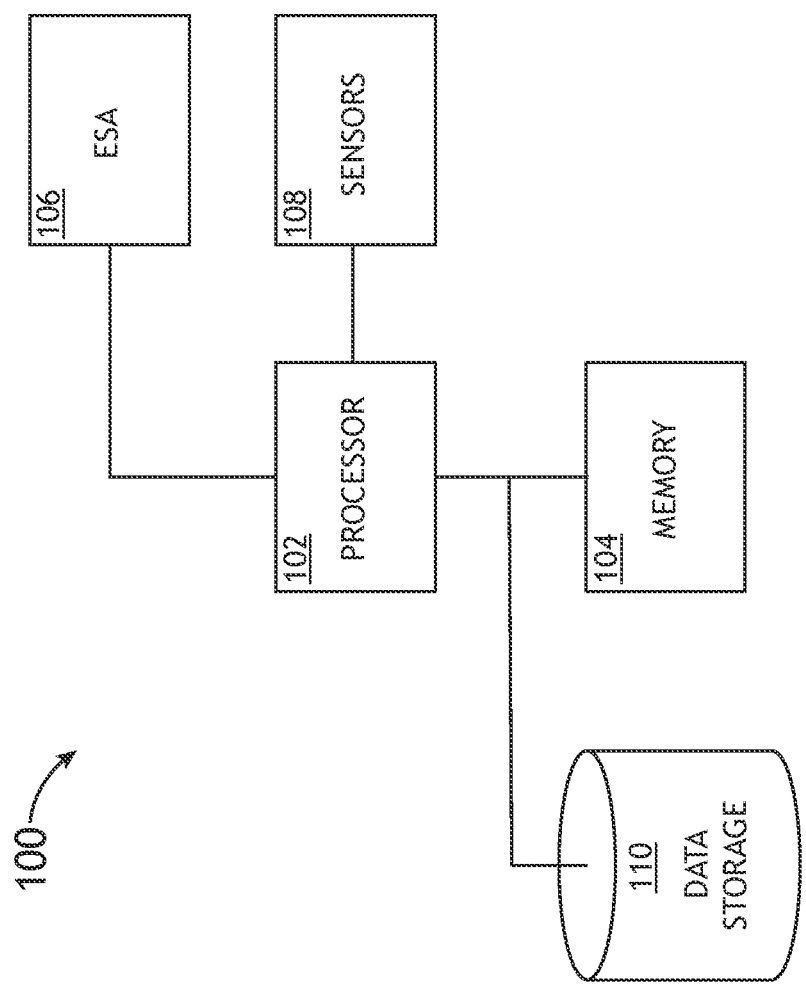
FIG. 1 shows a block diagram of a system useful for implementing exemplary embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for calibrating ESAs. An amplitude taper is calculated based on ESA element coordinates, and stored as a vector matrix of normalized desired gain values. The gain value measurements are normalized by measuring one or more elements at minimum attenuation. This measurement is then used as a reference for every subsequent measurement. All elements are then measured at various attenuations to determine which attenuation register values produce the desired normalized gain. The measurements are performed according to a bisection algorithm. Attenuation may be embodied in a set of digital register values.

Referring to FIG. 1, a block diagram of a system 100 useful for implementing exemplary embodiments of the present disclosure is shown. The system 100 includes a processor 102 and memory 104 storing processor executable code for configuring the processor 102 to apply signals to an ESA 106.

ESAs 106 require gain and phase calibration due to variation in RFIC performance over temperature and frequency. Calibration of ESAs 106 has traditionally been limited to the generation of phase and gain calibration coefficients to achieve a uniformly illuminated aperture. These coefficients are in units of dB for gain and degrees for phase. In practice, applying these calibration coefficients involves passing the gain and phase values into a gain table and a phase table. These tables may be generated or provided in the RFIC datasheet. Reliance on a single gain and phase table for a full array will result in residual gain and phase errors after calibration due to part-to-part variation.

In a calibration process to identify accurate calibration values for low sidelobe operation, the processor 102 calculates a taper for the ESA 106 based on known coordinates of each radiating element in the ESA 106 and desired sidelobe levels. The taper is stored in an N×1 vector of gain values where N is the number of radiating elements in the ESA 106.

Figure 2:
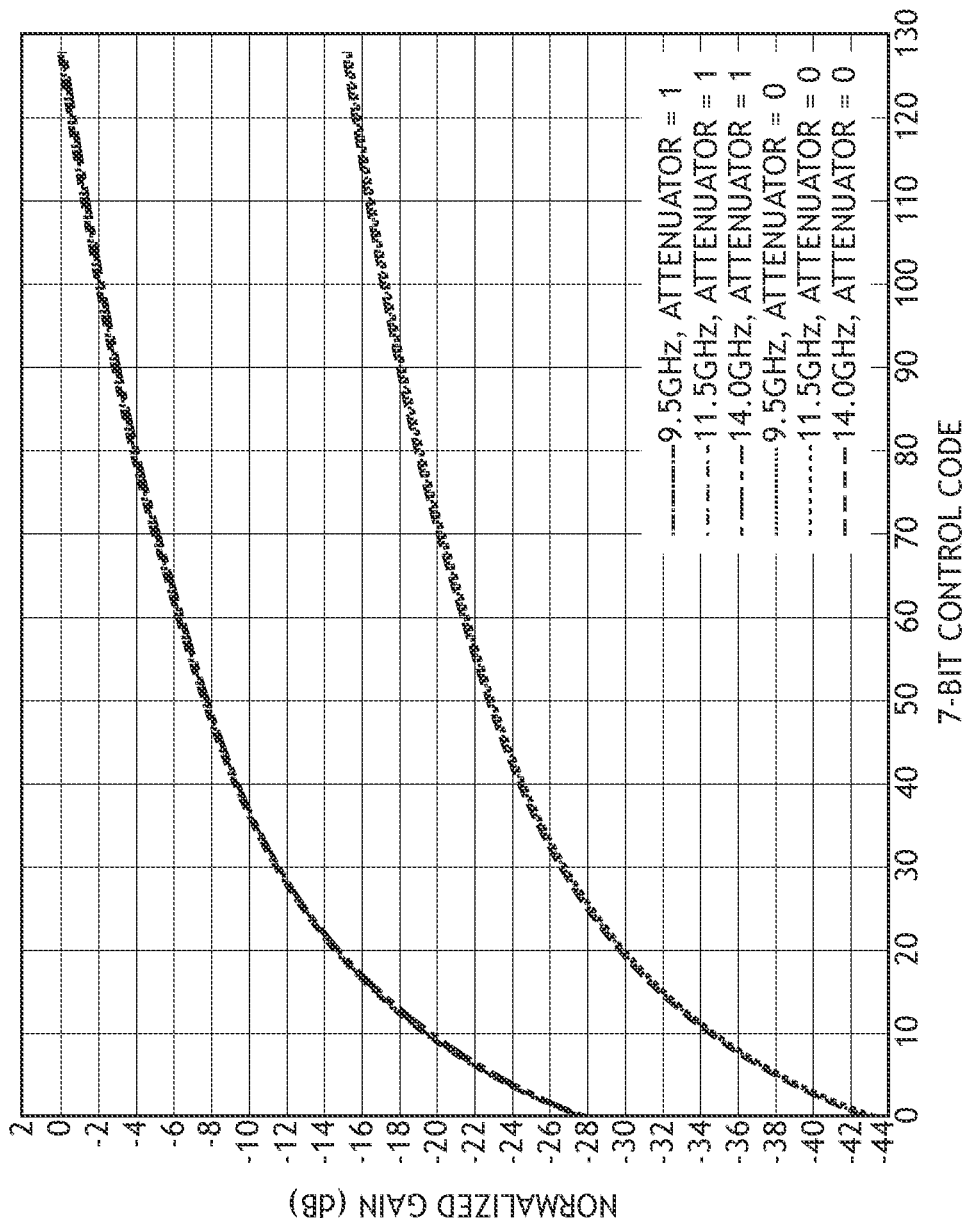
FIG. 2 shows a relationship between normalized gain and attenuation control values for the Radio Frequency integrated circuits (RFIC) Beamformer (BF) and Transmit/Receive Module (TRM)s in an ESA, as embodied in a digital register.

In at least one embodiment, loss values, such as path loss, cable loss, etc., are accounted for via a reference gain value for future measurements to produce a normalized gain as illustrated in FIG. 2. The processor 102 may determine the normalized gain by applying signals to a first set of radiating elements to minimize attenuation and to a second set of radiating elements to maximize attenuation. The processor 102 may then measure an actual gain via one or more sensors 108. Future gain measurements of any radiating element may be normalized as a ratio of the actual gain measurement to those future gain measurements.

The processor 102 determines an attenuation for each radiating element to approach an idealized gain value. In at least one embodiment, the processor 102 iteratively applies attenuation values to each radiating element, or some sample of radiating elements, and measures the corresponding gain via the one or more sensors 108. In at least one embodiment, the iterative measurements are made via a bisection or binary algorithm wherein a maximum and minimum attenuation register setting range is determined, and a midpoint attenuation register setting of the range is applied. The resulting gain is measured, compared to the desired normalized gain value, and the attenuation register setting range adjusting with the midpoint replacing either the maximum or minimum attenuation register setting. The process is repeated until a gain is determined within a threshold of accuracy.

The processor 102 stores the determined attenuation register settings for the radiating elements as an N×1 vector in a data storage element 110 for later reference when configuring the ESA 106 for low sidelobe transmission or reception. The final iterative measurements define amplitude and phase information. The processor 102 may utilize the phase information to determine a phase calibration that is also stored in the data storage element 110.

Figure 3:
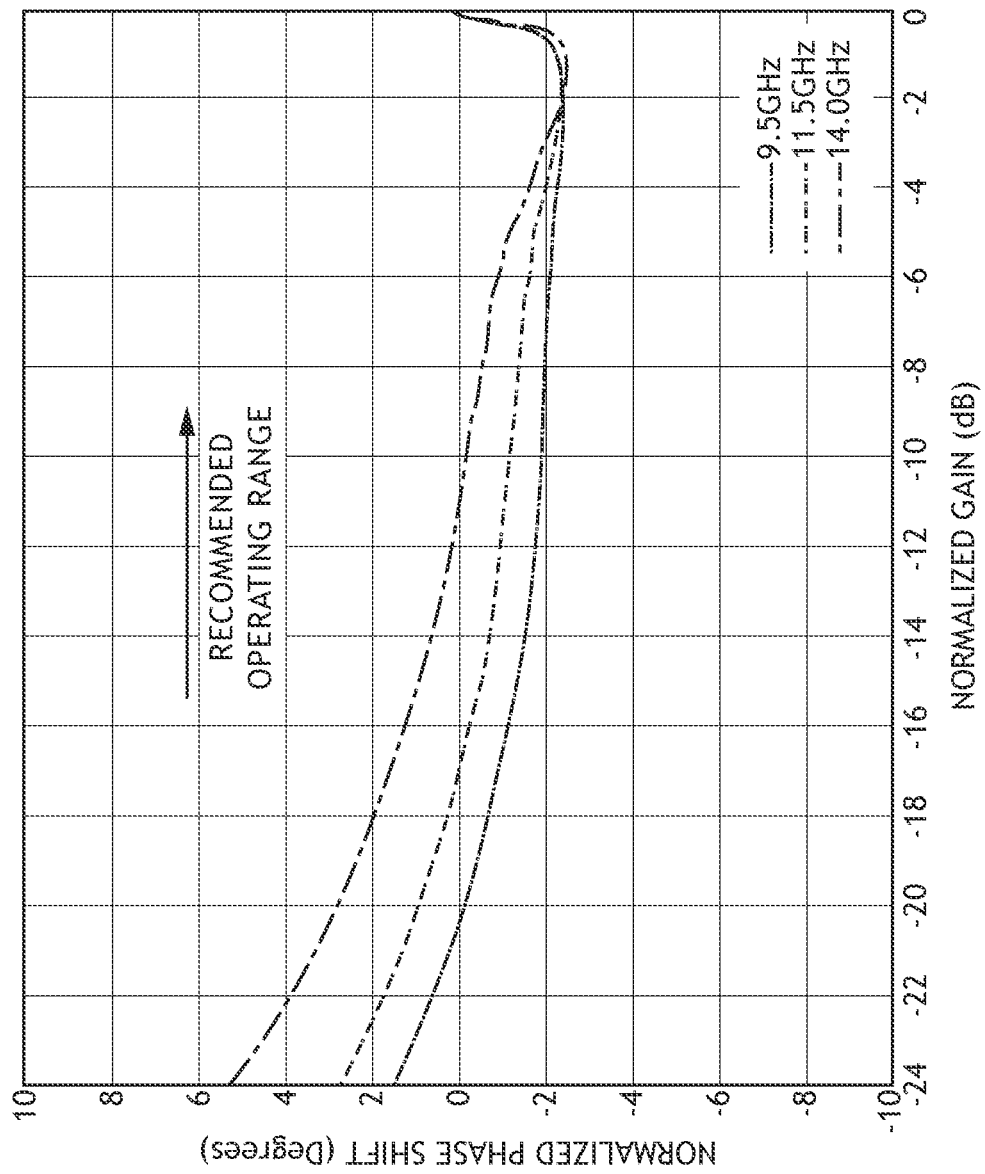
FIG. 3 shows a relationship between normalized phase shift and normalized gain of the RFIC BF and TRMs in an ESA.

Phase shift is coupled to amplitude as illustrated in FIG. 3; any arbitrary pattern synthesis function, when producing an amplitude change, also causes a subtle phase shift which may be detrimental (a change in gain produces some degrees of phase offset, which can greatly reduce the amount of sidelobe rejection). The phase from the stored vector may be used as an additional phase calibration wherein phase shift may be compensated for as the processor 102 converges to an amplitude solution.

Traditional phase calibration may include measuring all of the elements in a nominal state of 0 dB attenuation and 0 degrees phase offset to determine phase errors. In at least one embodiment, the processor 102 may, at each step of the iterative process, determine the actual phase shift for each element. Conceptually, each iteration measures the array in a state of intended operation, enabling instantaneous phase shift measurement at that aperture.

The calibration can be generalized to multidimensional calibration algorithms as a function of: beam scan/pointing, polarization state for dual polarization/circular polarized or polarization agile ESA architectures, dynamic beam shape control, temperature (as the test system 100 is compact enough to be engulfed within a electromagnetically benign temperature chamber/test vessel), and ESA transmit parameters such as effective isotropic radiated power (EIRP), compression/linearity/pulse parameters, etc.

In at least one embodiment, calibration can be performed in the field via vehicular in-situ calibration because the test system 100 is physically compact, and is conceptually straight forward with simple hardware. In at least one embodiment, calibration may generate a trained neural network configured to utilize the determined calibration attenuation and gain values, along with polarization, temperature, EIRP, etc.

Figure 4:
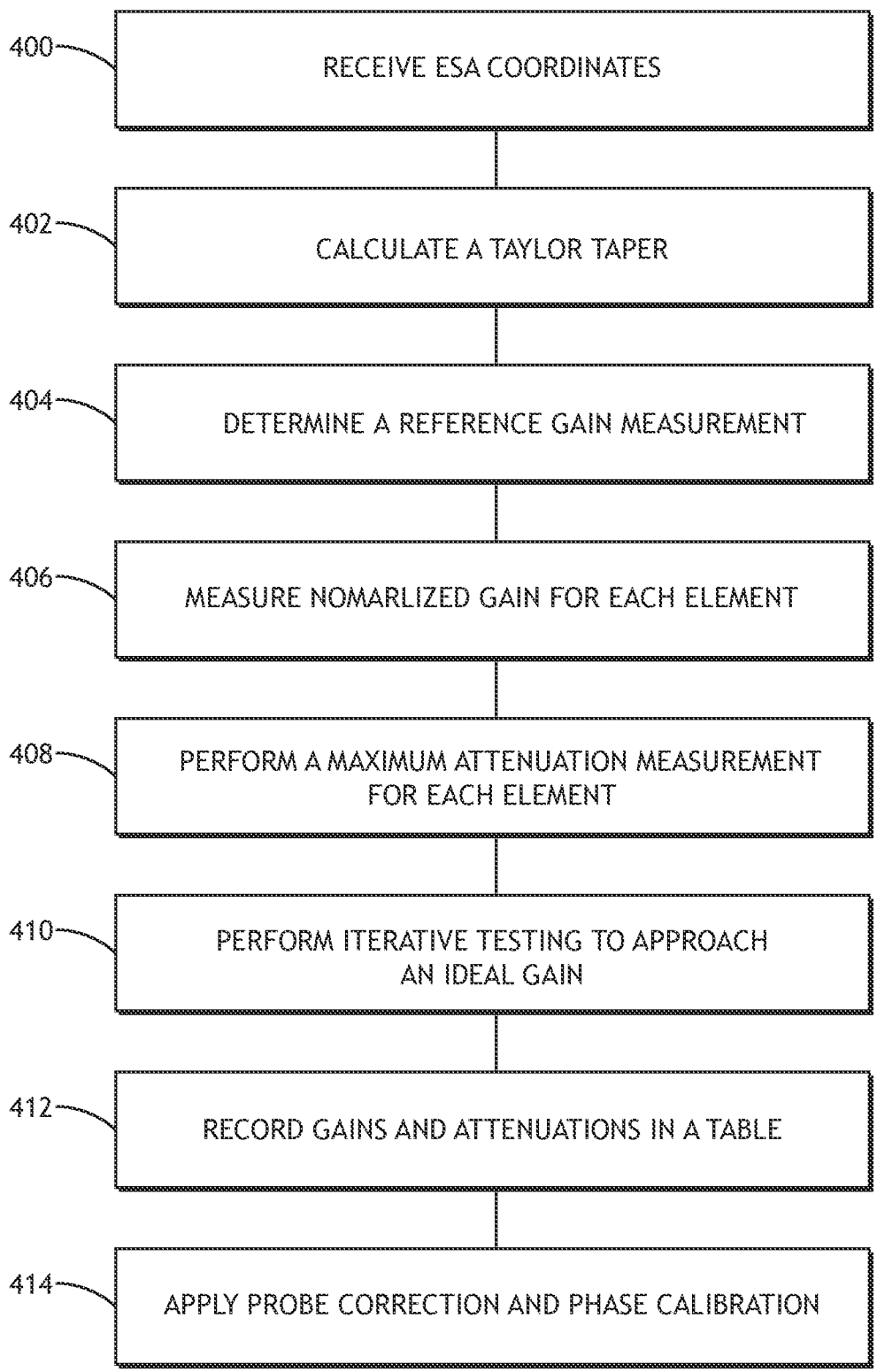
FIG. 4 shows a flowchart of a method for calibrating an ESA according to an exemplary embodiment.

Referring to FIG. 4, a flowchart of a method for calibrating an ESA according to an exemplary embodiment is shown. A calibrating processor receives 400 a set of ESA radiating element coordinates and calculates 402 a Taylor taper based on the coordinates and desired sidelobe levels. This taper is stored as an N×1 vector of normalized gain values denoted as $G_n$. In at least one embodiment, calculating the Taylor taper comprises using an aperture excitation polynomial function. It may be appreciated that the aperture excitation function may be generalized beyond Taylor synthesis techniques to non-Taylor tapers.

In at least one embodiment, the calibrating processor determines the overall loss of the measurement system and determines 404 a gain reference for each radiating element. In at least one embodiment, center radiating elements have approximately 0 dB attenuation in an ideally tapered array, making them a good reference for a normalization factor such that each radiating element can meet its desired normalized gain values (typically −24 dB to 0 dB for a Taylor taper). A measurement may be taken on one or more of the center radiating elements of the array, where the center radiating elements are set to a minimum attenuation and all other radiating elements at maximum attenuation; such measurement produces an upper limit that may comprise a normalization factor. In at least one embodiment, the reference measurement can fail if the center radiating element is faulty, or has significantly lower or higher gain than the average radiating element. Measuring a sample of radiating element is desirable to ensure calculations converge on a solution for most of the radiating elements.

For example, for a Taylor taper, the center radiating elements should have a 0 dB attenuation; a measure value of −40 dB is the reference measurement. Every future measurement is divided by that value. The value may be a complex value from a vector network analyzer.

Maximum gain elements should not be compressed for an ESA in receive mode, but may need to be in some level of compression for an ESA transmit mode. Using the center radiating elements (or any radiating element having a 0 dB attenuation for the taper of interest) for a reference level ensures prevention of compression for the centermost regions of the ESA in a receive mode, sufficient beamformer and transmit/receive module RFIC dynamic range, and Signal-to-Noise Ratio (SNR) to realize a desired amplitude taper across the array. The center radiating element measurement may be used as a reference for all other elements. Future gain measurements are normalized 406 as the ratio of any actual measurement to this reference measurement.

In at least one embodiment, the ESA may have relatively simple array geometry with the elements positioned in a grid of rows and columns. For tiled ESAs, or designs where the elements do not lie on a simple grid such as conformal arrays, each element is assigned an index n.

The gain and phase of each RF channel is dictated by standard array pattern synthesis techniques. For each element index n in the array, a gain measurement $M_r$ is taken 408 with all array elements maximally attenuated (for example, approximately 28 dB plus 16 dB attenuator switch). Such measurement corresponds to an "off" state. Then an iterative gain testing methodology begins wherein attenuation values are iteratively tested 410 until a threshold gain value is identified (for example, no more than 0.25 dB away from the desired normalized gain), and the gain value and corresponding attenuation register settings are stored 412. In at least one embodiment, iterative testing methodology comprises a binary or bisection algorithm wherein the first iterative test 410 is at a midpoint operative range (the full range of a variable gain attenuator) applied to element n and a new gain measurement $M_f$ is taken. If $M_f - M_r > G_n$, the new testing range is set to [maximum attenuation, midpoint]; conversely, if $M_f - M_r < G_n$, the new testing range is set to [minimum attenuation, midpoint]. Such process may repeat for a known maximum number of iterations. For example, where a variable gain attenuator has eight bits, the range would be 0 to 255; where a variable gain attenuator has seven bits, the range would be 0 to 127. In that case, the maximum number of iterations is seven. After up to 7 iterations, the process will reach the exact register number that achieves the desired normalized gain for that radiating element. The process is repeated for all radiating elements one to n and the terminal register value for each step in that process is stored.

Attenuation register settings and gain measurements for all elements, which may be complex values, are stored 412 as a N×1 vector. An accurate amplitude taper across the array is established; the terminal measurements (i.e., when the maximum iterations or gain threshold is reached) contain amplitude and phase information. Phase information is used for phase calibration. Probe correction and phase calibration are then calculated and applied 414.

The end result is a single vector of attenuator register settings and phase offset values for all of the array elements that may be passed into the table which provides a reference for what phase register setting is needed to achieve those values.

Antenna calibration is a function of determining the phase and gain offsets of the RFIC BF and TRMs driving the radiating elements in the aperture. Those values are used in tables for gain and phase control in the devices. Firmware speed limits the amount of data that can be reference; typically, a single gain table and a single phase table for all devices in the array. Such tables are less accurate than getting the exact state that every chip needs to achieve a low side lobe level taper.

Embodiments of the present disclosure enable a systematic methodology to minimize active ESA aperture phase and amplitude errors for low sidelobe performance by applying the optimal register settings. Calibration procedures according to embodiments described herein remove second order parasitic amplitude-phase interactions within the active ESAs beamformer and transmit/receive module RFICs to enable minimal error solution convergence.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus for calibrating and electronically scanned array (ESA) antenna comprising:
   at least one processor in data communication with a memory storing processor executable code for configuring the at least one processor to:
   calculate an amplitude taper based on coordinates of radiating elements in the ESA;
   store the taper as a vector of gain values;
   normalize the gain values;
   determine an attenuation value for each radiating element to approach the normalized gain within a predefined threshold of accuracy;
   store the attenuation register values as a vector; and
   calculate a probe correction and phase calibration.

2. The computer apparatus of claim 1, wherein determine the attenuation value for each radiating element comprises:
   iteratively selecting a midpoint in an attenuation value range;
   determining a gain at the selected attenuation value;
   comparing the gain to a target value; and
   updating the attenuation value range based on the comparison.

3. The computer apparatus of claim 2, wherein the at least one processor is further configured to:
- determine a terminal measurement comprising a final iteration when the predefined threshold of accuracy is reached;
- determine phase shift information based on the terminal measurement; and
- determine a phase calibration based on the phase information.

4. The computer apparatus of claim 1, wherein each attenuation value comprises a digital register setting.

5. The computer apparatus of claim 1, wherein each vector comprises an N×1 vector corresponding to a quantity of radiating elements in the ESA.

6. The computer apparatus of claim 1, wherein:
- normalizing the gain values comprises:
  - setting one or more center radiating elements to a minimum attenuation;
  - setting all other radiating elements to a maximum attenuation; and
  - recording a gain value for the one or more center radiating elements; and
- the normalized gain comprises a ratio of measured gain of any radiating element to the reference gain value of the one or more radiating elements.

7. An electronically scanned array (ESA) antenna comprising:
- a plurality of radiating elements;
- at least one processor in data communication with the plurality of radiating elements and a memory for storing processor executable code, the at least one processor configured to drive the plurality of radiating elements,
- wherein the processor is configured to apply calibration settings to any signal configuring the plurality of radiating elements, the calibration settings determine by:
  - calculate a taper based on coordinates of each radiating element;
  - store the taper as a vector of gain values;
  - normalize the gain values;
  - determine an attenuation value for each radiating element to approach the normalized gain within a predefined threshold of accuracy; and
  - store the attenuation values as a vector.

8. The ESA antenna of claim 7, wherein the calibration settings are further determined by calculating a probe correction and phase calibration.

9. The ESA antenna of claim 7, wherein determine the attenuation value for each radiating element comprises:
- iteratively selecting a midpoint in an attenuation value range;
- determining a gain at the selected attenuation value;
- comparing the gain to a target value; and
- updating the attenuation value range based on the comparison.

10. The ESA antenna of claim 9, wherein the calibration settings are further determined by:
- determining a terminal measurement comprising a final iteration when the predefined threshold of accuracy is reached;
- determining phase shift information based on the terminal measurement; and
- determining a phase calibration based on the phase information.

11. The ESA antenna of claim 7, wherein each attenuation value comprises a digital registry setting.

12. The ESA antenna of claim 7, wherein each vector comprises an N×1 vector corresponding to a quantity of radiating elements.

13. The ESA antenna of claim 7, wherein:
- normalizing the gain values comprises:
  - setting one or more center radiating elements to a minimum attenuation;
  - setting all other radiating elements to a maximum attenuation; and
  - recording a gain value for the one or more center radiating elements; and
- the normalized gain comprises a ratio the recorded gain value of the one or more center radiating elements to a measured gain of any other radiating element.

* * * * *